US009059746B2

(12) United States Patent
Dixon et al.

(10) Patent No.: US 9,059,746 B2
(45) Date of Patent: Jun. 16, 2015

(54) DATA SHARING METHOD, TRANSMITTER, RECEIVER AND DATA SHARING SYSTEM

(71) Applicant: Kabushiki Kaisha Toshiba, Minato-ku (JP)

(72) Inventors: Alex Dixon, Kawasaki (JP); Yoshimichi Tanizawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 119 days.

(21) Appl. No.: 13/972,113

(22) Filed: Aug. 21, 2013

(65) Prior Publication Data

US 2014/0095957 A1   Apr. 3, 2014

(30) Foreign Application Priority Data

Oct. 1, 2012 (JP) ................................. 2012-219551

(51) Int. Cl.
*H03M 13/00* (2006.01)
*H03M 13/11* (2006.01)
*H03M 13/37* (2006.01)
*H04L 9/08* (2006.01)
*H03M 7/30* (2006.01)

(52) U.S. Cl.
CPC ...... *H03M 13/6312* (2013.01); *H03M 13/1105* (2013.01); *H03M 13/3761* (2013.01); *H03M 13/6306* (2013.01); *H04L 9/0858* (2013.01); *H03M 7/30* (2013.01)

(58) Field of Classification Search
None
See application file for complete search history.

(56) References Cited

U.S. PATENT DOCUMENTS

| 5,581,481 | A  | * | 12/1996 | Weerackody et al. | ........... 341/50 |
| 5,936,972 | A  | * | 8/1999  | Meidan et al.     | ............... 714/712 |
| 7,461,323 | B2 | * | 12/2008 | Matsumoto et al.  | .......... 714/758 |
| 7,990,290 | B1 | * | 8/2011  | Jagmohan et al.   | ............... 341/50 |
| 8,331,445 | B2 | * | 12/2012 | Garudadri et al.  | ........ 375/240.12 |
| 2005/0031219 | A1 | * | 2/2005 | Puri et al.       | ....................... 382/250 |
| 2006/0048038 | A1 | * | 3/2006 | Yedidia et al.    | ................ 714/793 |
| 2007/0217541 | A1 | * | 9/2007 | Liu et al.        | ....................... 375/279 |
| 2008/0219447 | A1 | * | 9/2008 | McLaughlin        | .................. 380/270 |
| 2008/0222487 | A1 |   | 9/2008 | Matsumoto         |  |
| 2009/0228757 | A1 | * | 9/2009 | Nishi             | ............................ 714/752 |

OTHER PUBLICATIONS

Stankovic, V.; Liveris, A.D.; Zixiang Xiong; Georghiades, C.N., "Design of Slepian-Wolf codes by channel code partitioning," Data Compression Conference, 2004. Proceedings. DCC 2004 , vol., no., pp. 302,311, Mar. 23-25, 2004.*

(Continued)

*Primary Examiner* — Steve Nguyen
(74) *Attorney, Agent, or Firm* — Oblon, McClelland, Maier & Neustadt, L.L.P.

(57) ABSTRACT

According to one embodiment, a transmitter includes a signal dividing unit, a syndrome sending unit, a syndrome receiving unit and a decoding unit. The signal dividing unit divides an original signal into a first signal and a second signal based on a common dividing policy. The syndrome sending unit sends the first syndrome message calculated based on the first signal through a clear channel. The syndrome receiving unit receives a second syndrome message through the clear channel. The decoding unit decodes the second signal by using the second syndrome message to restore a fourth signal, the fourth signal being corresponding to the second signal received by a receiver through a noisy channel.

8 Claims, 9 Drawing Sheets

(56) References Cited

OTHER PUBLICATIONS

Liveris, A.D.; Zixiang Xiong; Georghiades, C.N., "Joint source-channel coding of binary sources with side information at the decoder using IRA codes," Multimedia Signal Processing, 2002 IEEE Workshop on , vol., no., pp. 53,56, Dec. 9-11, 2002.*

Pradhan, S.S.; Ramchandran, K., "Distributed source coding using syndromes (DISCUS): design and construction," Data Compression Conference, 1999. Proceedings. DCC '99 , vol., no., pp. 158,167, Mar. 29-31, 1999.*

Kotagiri, S., "Source Coding with Decoder Side Information," Sep. 27, 2006.*

Combined Search and Examination Report issued on Feb. 18, 2014 in United Kingdom Patent Application No. GB1315054.5.

Kenta Kasai, et al., "Information reconciliation for QKD with rate-compatible non-binary LDPC codes", International Symposium on Information Theory & Its Applications (ISITA2010), IEEE, Oct. 2010, pp. 922-927.

Patcharapong Treeviriyanupab, et al., "BCH-based slepian-wolf coding with feedback syndrome decoding for quantum key reconciliation", International Conference on Electrical Engineering/Electronics, Computer, Telecommunications and Information Technology (ECTI-CON 2012), IEEE, May 2012, 4 Pages.

Robert G. Gallager "Low-Density Parity-Check Codes", PhD Thesis, Massachusetts Institutes of Technology, 1963 ,90 pages.

David Slepian et al. "Noiseless Coding of Correlated Information Sources", IEEE Transactions on Information Theory, vol. It-19, No. 4, Jul. 1973, pp. 471-480.

* cited by examiner

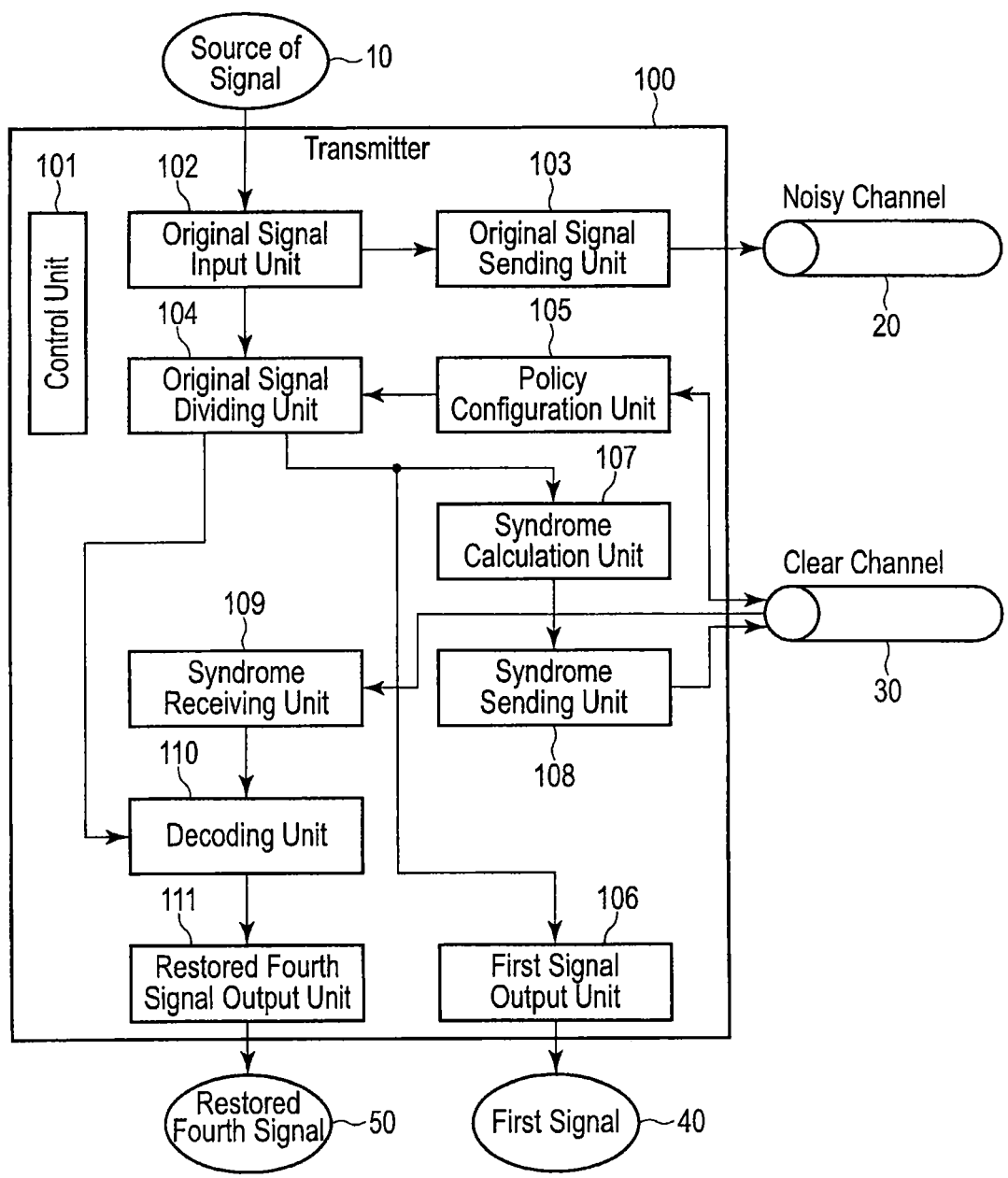
F I G. 1

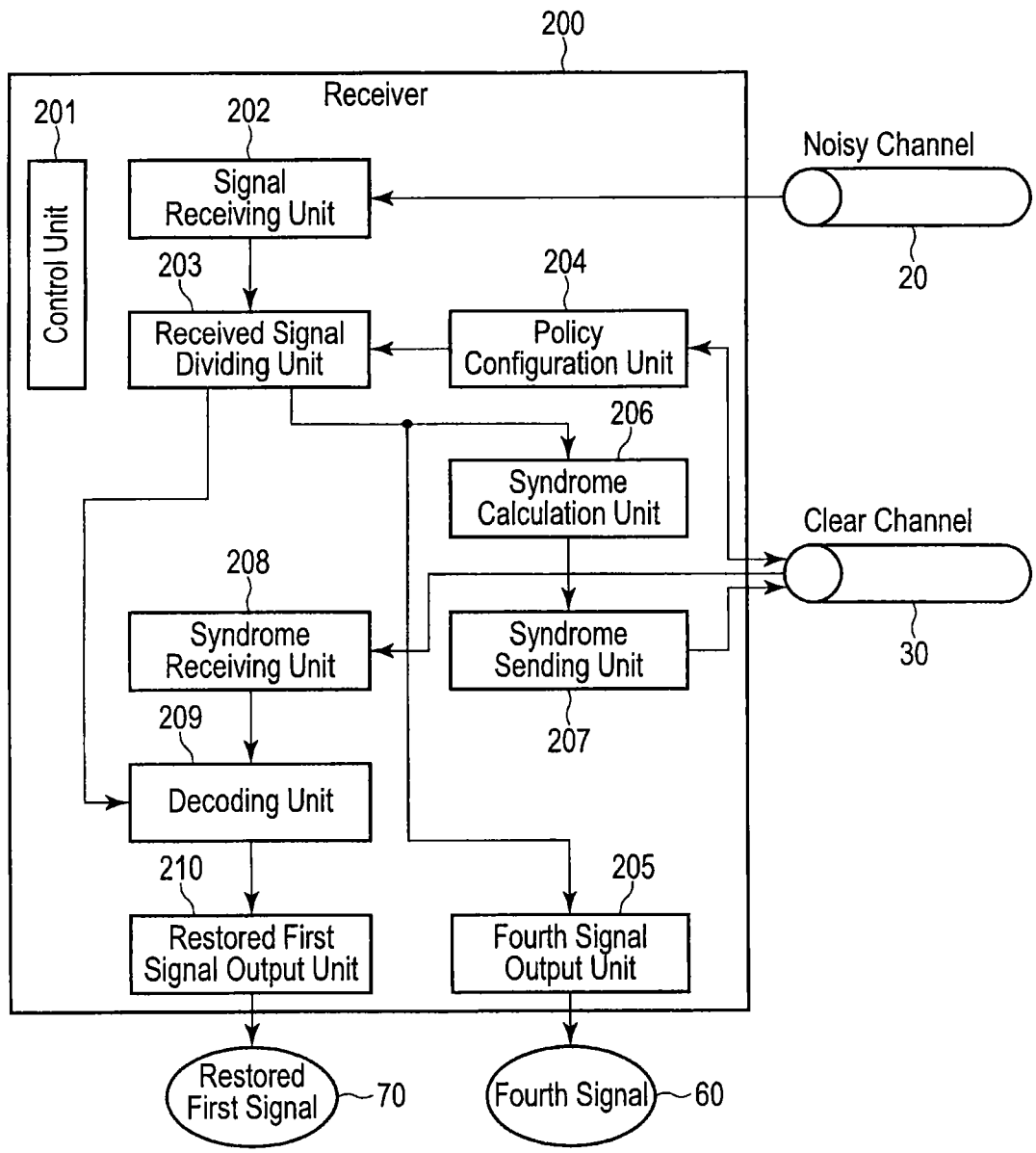
F I G. 2

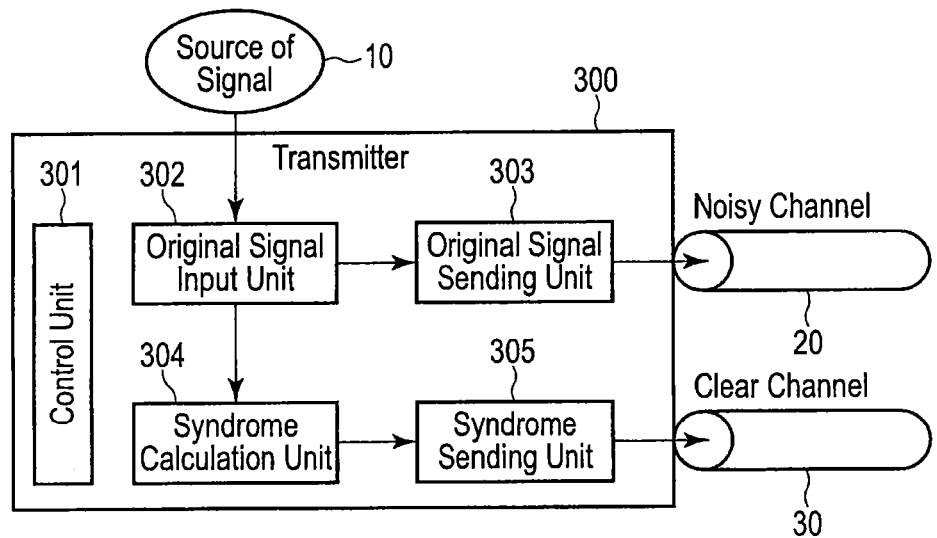
F I G. 3
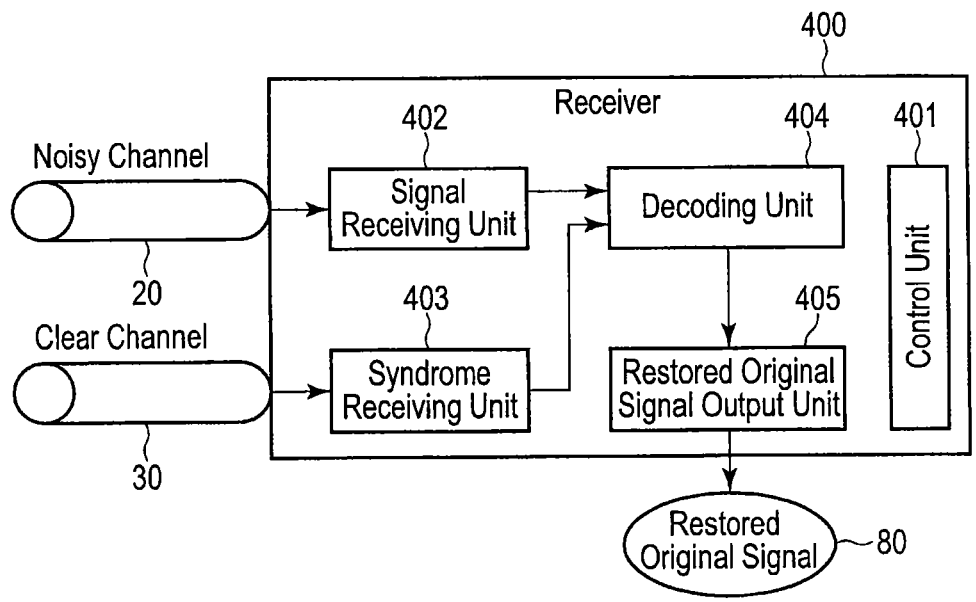
F I G. 4

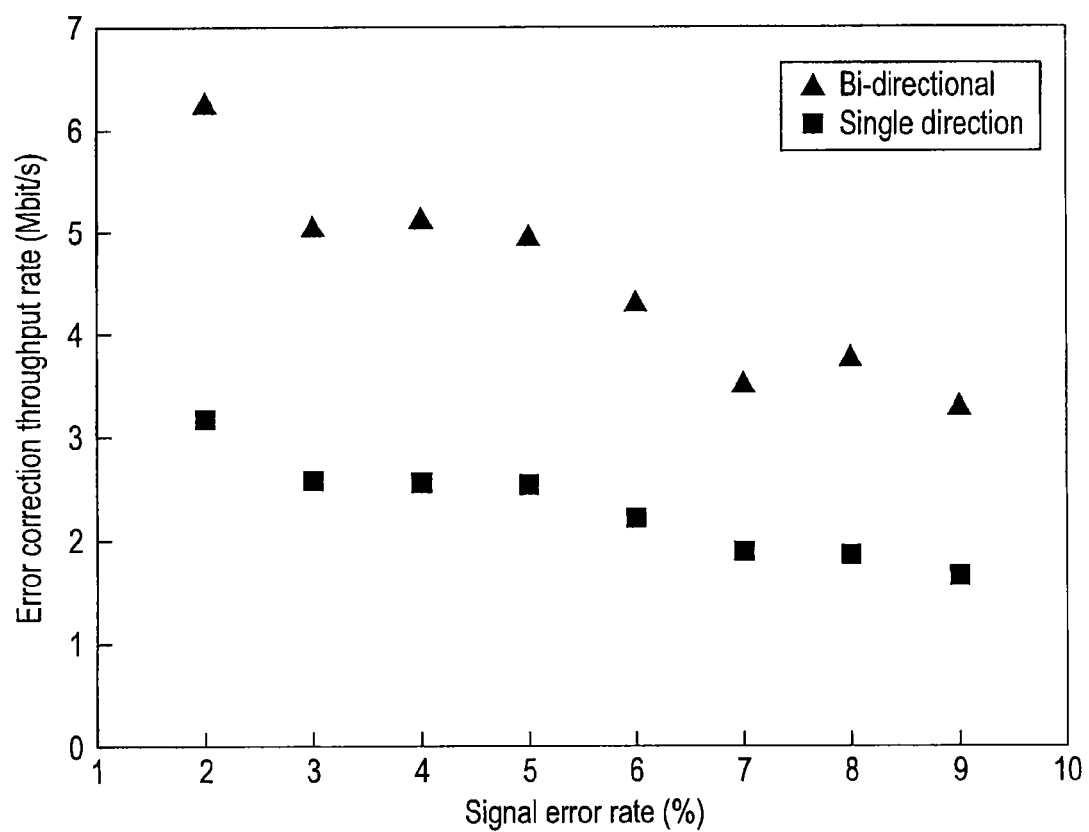
F I G. 9

DATA SHARING METHOD, TRANSMITTER, RECEIVER AND DATA SHARING SYSTEM

CROSS-REFERENCE TO RELATED APPLICATIONS

This application is based upon and claims the benefit of priority from Japanese Patent Application No. 2012-219551, filed Oct. 1, 2012, the entire contents of which are incorporated herein by reference.

FIELD

Embodiments described herein relate generally to data sharing based on Slepian-Wolf type low density parity check error correction.

BACKGROUND

In Quantum Key Distribution (QKD), identical data is shared between 2 nodes. Further, for example, a random number sharing system and a quantum cryptography system also need such data sharing.

A transmitter generally sends a signal including data through a noisy channel. The noisy channel may introduce errors into the signal. Therefore, the data sent by the transmitter may be different from the data received by the receiver. In order to share identical data between the transmitter and the receiver, it is necessary for the signal to be error corrected. Error correction can remove the noise introduced by the noisy channel from the data received by the receiver.

One method of error correction is using forward error correcting codes. According to forward error correction, the transmitter transforms (i.e. encodes) an original signal into a longer signal before sending. The longer signal can be called encoded signal. The encoded signal includes redundant information (which may be called parity bits). The transmitter sends the encoded signal to the receiver. As described above, the noisy channel may introduce errors into the encoded signal. However, the receiver can then inversely transforms (i.e. decodes) the noisy encoded signal back into the original signal by using the redundant information to correct any errors introduced by the noisy channel.

Low Density Parity Check (LDPC) codes are a certain type of forward error correcting codes. LDPC codes can be used for correcting errors introduced through communication. LDPC codes can correct errors with close to the theoretical minimum amount of redundant information added. Further LDPC codes can also be decoded computationally efficiently using iterative decoding.

Slepian-Wolf coding is one of known schemes of the forward error correction described above. According to Slepian-Wolf coding, the transmitter does not encode the original signal. However, the transmitter uses the error correction code to calculate an additional "syndrome" message based on the original signal. The syndrome message includes redundant information. The transmitter sends the original signal through a noisy channel and sends the syndrome message through a clear channel. The receiver receives both the noisy original signal and the syndrome message. The receiver can then use the redundant information in the syndrome message to decode the received noisy original signal back to the original signal. In particular, the receiver can perform the same decoding process as in standard forward error correction.

In error correction the rate at which the received signal can be processed to remove errors (expressed as the throughput rate, in bits per second) is important for many applications. The throughput rate is typically limited by the computational effort of encoding the original signal into the encoded signal and subsequently decoding the noisy encoded signal back into the original signal.

However, according to Slepian-Wolf coding, the encoding process can be replaced by the syndrome calculation process. Here, the syndrome calculation process is computationally much simpler than the encoding process. Therefore, in Slepian-Wolf coding, the main limitation on the throughput rate is only the decoding process performed by the receiver.

BRIEF DESCRIPTION OF THE DRAWINGS

FIG. 1 is a block diagram illustrating a transmitter according to a first embodiment.

FIG. 2 is a block diagram illustrating a receiver according to the first embodiment.

FIG. 3 is a block diagram illustrating a comparative transmitter.

FIG. 4 is a block diagram illustrating a comparative receiver.

FIG. 9 is a graph illustrating the throughput rates of the first embodiment and the comparative example.

DETAILED DESCRIPTION

Figure 5:
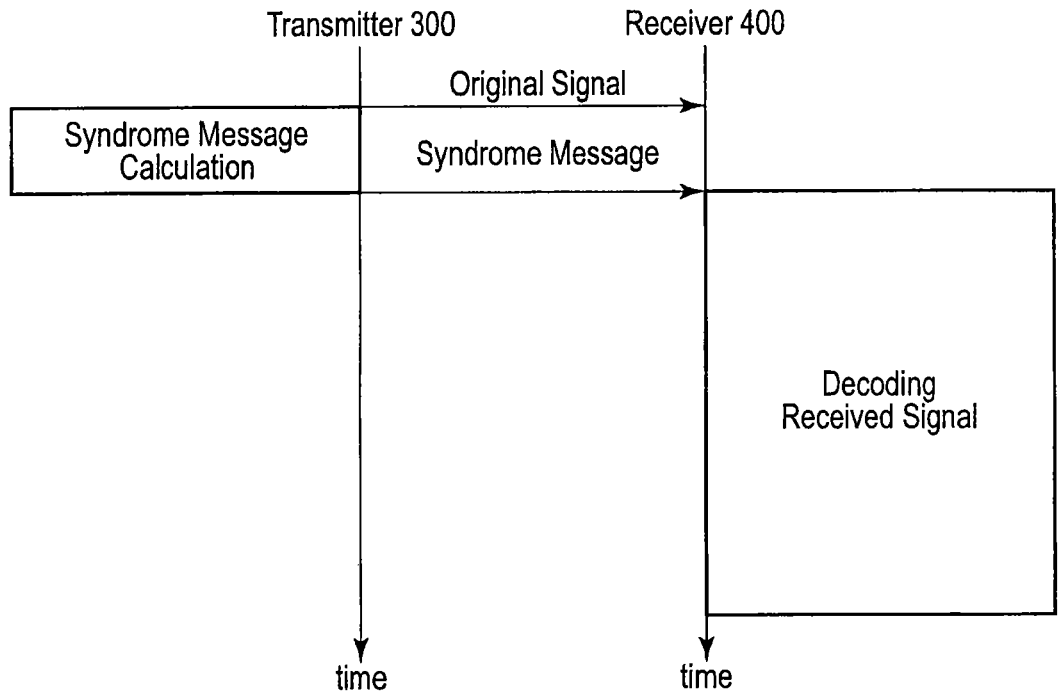
FIG. 5 is a ladder diagram illustrating the process and communications performed by the transmitter and receiver of FIGS. 3 and 4.

Embodiments will be described below with reference to the drawings.

In general, according to one embodiment, a data sharing system includes a transmitter and a receiver.

The transmitter includes a signal sending unit, a first policy configuration unit, a first signal dividing unit, a first syndrome calculation unit, a first syndrome sending unit, a first syndrome receiving unit and a first decoding unit. The signal sending unit sends an original signal through a noisy channel. The first policy configuration unit defines a common dividing policy. The first signal dividing unit divides the original signal into a first signal and a second signal based on the common dividing policy. The first syndrome calculation unit calculates a first syndrome message for error correction based on the first signal. The first syndrome sending unit sends the first syndrome message through a clear channel. The first syndrome receiving unit receives a second syndrome message through the clear channel. The first decoding unit decodes the second signal by using the second syndrome message to restore a fourth signal.

The receiver includes a signal receiving unit, second policy configuration unit, a second signal dividing unit, a second syndrome receiving unit, a second syndrome calculation unit, a second syndrome sending unit and a second decoding unit. The signal receiving unit receives the original signal through the noisy channel to obtain a received signal. The second policy configuration unit defines the common dividing policy.

The second signal dividing unit divides the received signal into a third signal and the fourth signal based on the common dividing policy, the third signal and the fourth signal being corresponding to the first signal and the second signal. The second syndrome receiving unit receives the first syndrome message through the clear channel. The second syndrome calculation unit calculates a second syndrome message based on the fourth signal. The second syndrome sending unit sends the second syndrome message through the clear channel. The second decoding unit configured to decode the third signal by using the first syndrome message to restore the first signal.

First Embodiment

As shown in FIG. 1, a transmitter 100 according to a first embodiment comprises a control unit 101, an original signal input unit 102, an original signal sending unit 103, an original signal dividing unit 104, a policy configuration unit 105, a first signal output unit 106, a syndrome calculation unit 107, a syndrome sending unit 108, a syndrome receiving unit 109, a decoding unit 110 and a restored fourth signal output unit 111.

The control unit 101 controls various elements in the transmitter 100.

The original signal input unit 102 inputs an original signal from a source of signal 10. As described below, the original signal is divided into two parts by the original signal dividing unit 104. To be more precise, the original signal is divided into a first signal and a second signal. The original signal input unit 102 outputs the original signal to the original signal sending unit 103 and original signal dividing unit 104.

The original signal sending unit 103 inputs the original signal from the original signal input unit 102. The original signal sending unit 103 sends the original signal through a noisy channel 20. The noisy channel 20 may add some noise (i.e. errors) to the original signal.

The original signal dividing unit 104 inputs the original signal from the original signal input unit 102. The original signal dividing unit 104 divides the original signal into the first signal and the second signal. Here, how the original signal dividing unit 104 divides the original signal is determined by a common dividing policy from the policy configuration unit 105. The common dividing policy will be described below in detail. The original signal dividing unit 104 outputs the first signal to the first signal output unit 106 and the syndrome calculation unit 107. Further, the original signal dividing unit 104 outputs the second signal to the decoding unit 110.

The policy configuration unit 105 defines the common dividing policy. The policy configuration unit 105 notifies the original signal dividing unit 104 of the common dividing policy.

The first signal output unit 106 inputs the first signal from the output signal dividing unit 104. The first signal output unit 106 outputs the first signal 40. As described below, the first signal 40 serves as a part of shared data in the transmitter 100.

The syndrome calculation unit 107 inputs the first signal from the original signal dividing unit 104. The syndrome calculation unit 107 calculates a first syndrome message based on the first signal. The first syndrome message can be used to correct errors added to the first signal. The syndrome calculation unit 107 outputs the first syndrome message to the syndrome sending unit 108.

The syndrome sending unit 108 inputs the first syndrome message from the syndrome calculation unit 107. The syndrome sending unit 108 sends the first syndrome message through a clear channel 30. The clear channel 30 can correctly carry any signal.

The syndrome receiving unit 109 receives a second syndrome message through the clear channel 30. As described below, the second syndrome message is calculated and sent by a receiver 200. The second syndrome message can be used to correct errors added to a fourth signal. The fourth signal will be described below in detail. The syndrome receiving unit 109 outputs the second syndrome message to the decoding unit 110.

The decoding unit 110 inputs the second signal from the original signal dividing unit 104 and inputs the second syndrome message from the syndrome receiving unit 109. The decoding unit 110 decodes the second signal by using the second syndrome message. As described below, the fourth signal corresponds to the noisy second signal sent by the transmitter 100. Conversely, the second signal corresponds to the noisy fourth signal. Therefore, the decoding unit 110 can restore the fourth signal through the decoding process. The decoding process may be based on Slepian-Wolf LDPC decoding. The decoding unit 110 outputs the restored fourth signal to the restored fourth signal output unit 111.

The restored fourth signal output unit 111 inputs the restored fourth signal from the decoding unit 110. The restored fourth signal output unit 111 outputs the restored fourth signal 50. As described below, the restored fourth signal 50 serves as a remaining part of the shared data in the transmitter 100.

As shown in FIG. 2, a receiver 200 according to the first embodiment comprises a control unit 201, a signal receiving unit 202, a received signal dividing unit 203, a policy configuration unit 204, a fourth signal output unit 205, a syndrome calculation unit 206, a syndrome sending unit 207, a syndrome receiving unit 208, a decoding unit 209 and a restored first signal output unit 210.

The control unit 201 controls various elements in the receiver 200.

The signal receiving unit 202 receives a signal through the noisy channel 20. The received signal corresponds to the noisy original signal sent by the transmitter 100. As described below, the received signal is divided into two parts by the received signal dividing unit 203. To be more precise, the received signal is divided into a third signal and the fourth signal. It is noted that the third signal corresponds to the noisy first signal and that the fourth signal corresponds to the noisy second signal. The signal receiving unit 202 outputs the received signal to the received signal dividing unit 203.

The received signal dividing unit 203 inputs the received signal from the signal receiving unit 202. The received signal dividing unit 203 divides the received signal into the third signal and the fourth signal. Here, how the received signal dividing unit 203 divides the received signal is determined by the common dividing policy from the policy configuration unit 204. The received signal dividing unit 203 outputs the third signal to decoding unit 209. Further, the received signal dividing unit 203 outputs the fourth signal to the fourth signal output unit 205 and the syndrome calculation unit 206.

The policy configuration unit 204 defines the common dividing policy. The policy configuration unit 204 notifies the received signal dividing unit 203 of the common dividing policy.

The fourth signal output unit 205 inputs the fourth signal from the received signal dividing unit 203. The fourth signal output unit 205 outputs the fourth signal 60. As described below, the fourth signal 60 serves as a part of shared data in the receiver 200.

The syndrome calculation unit 206 inputs the fourth signal from the received signal dividing unit 203. The syndrome calculation unit 206 calculates the second syndrome message based on the fourth signal. The syndrome calculation unit 206 outputs the second syndrome message to the syndrome sending unit 207.

The syndrome sending unit 207 inputs the second syndrome message from the syndrome calculation unit 206. The syndrome sending unit 207 sends the second syndrome message through the clear channel 30.

The syndrome receiving unit 208 receives the first syndrome message through the clear channel 30. The syndrome receiving unit 208 outputs the first syndrome message to the decoding unit 209.

The decoding unit 209 inputs the third signal from the received signal dividing unit 203 and inputs the first syndrome message from the syndrome receiving unit 208. The decoding unit 209 decodes the third signal by using the first syndrome message. As described above, the third signal corresponds to the noisy first signal. Therefore, the decoding unit 209 can restore the first signal through the decoding process. The decoding unit 209 outputs the restored first signal to the restored first signal output unit 210.

The restored first signal output unit 210 inputs the restored first signal from the decoding unit 209. The restored first signal output unit 210 outputs the restored first signal 70. As described below, the restored first signal 70 serves as a remaining part of the shared data in the receiver 200.

Finally, transmitter 100 and receiver 200 can shares identical data. The identical data corresponds to a combination of the first signal and the fourth signal.

As described above, both the transmitter 100 and the receiver 200 perform divided decoding process. Therefore, the decoding scheme of the transmitter 100 and receiver 200 can be named bi-directional decoding. In contrast, in the conventional Slepian-Wolf coding, a receiver performs decoding process, whereas a transmitter does not perform decoding process. Therefore, the conventional decoding scheme can be named single direction decoding.

In general, the decoding process is computationally expensive compared to calculating syndrome message. Therefore, in the single direction decoding, usage of computational resources in the transmitter and receiver is asymmetric. In other words, the computational effort in the receiver is much greater than the computational effort in the transmitter. This asymmetric usage of computational resources limits the throughput rate.

In contrast, in bi-directional decoding, the transmitter 100 and the receiver 200 can balance their usage of computational resources by utilizing the common dividing policy.

The common dividing policy may be the common local rules which can be acquired by the policy configuration unit 105 and the policy configuration unit 204. In other words, the policy configuration unit 105 and the policy configuration unit 204 may statically control the common dividing policy. For example, the common dividing policy may be even and odd policy. According to the even and odd policy, the original signal and the received signal are substantially equally divided. Here, it is assumed that, in the original signal and the received signal, data units are multiplexed. Further, each of the data units has data ID for identification. In this case, according to the even and odd policy, the data units in the original signal and the received signal are divided based on whether their data ID has an even value or an odd value.

Alternatively, the policy configuration unit 105 and the policy configuration unit 204 may dynamically control the common dividing policy. The dynamic control of the common dividing policy may aim to balance usage of computational resources in the transmitter 100 and the receiver 200. For example, the policy configuration unit 105 monitors the available resource in the transmitter 100 and the policy configuration unit 204 monitors the available computational resource in the receiver 200. Further, the policy configuration unit 105 and the policy configuration unit 204 exchange information on their monitoring result through the clear channel 30. Then, the policy configuration unit 105 and the policy configuration unit 204 control (i.e. update) the common dividing policy based on the available computational resources. For example, if both the transmitter 100 and the receiver 200 have equivalent available computational resources, the even and odd policy may be selected as the common dividing policy.

FIGS. 3 and 4 show comparative transmitter 300 and receiver 400. The transmitter 300 and the receiver 400 operate based on the single direction decoding.

As shown in FIG. 3 the transmitter 300 comprises a control unit 301, an original signal input unit 302, an original signal sending unit 303, a syndrome calculation unit 304 and a syndrome sending unit 305.

The control unit 301 controls various elements in the transmitter 300.

The original signal input unit 302 inputs an original signal from a source of signal 10. The original signal serves as a whole of shared data in the transmitter 300. The original signal input unit 302 outputs the original signal to the original signal sending unit 303 and the syndrome calculation unit 304.

The original signal sending unit 303 inputs the original signal from the original signal input unit 302. The original signal sending unit 303 sends the original signal through a noisy channel 20. The noisy channel 20 may add some noise (i.e. errors) to the original signal.

The syndrome calculation unit 304 inputs the original signal from the original signal input unit 302. The syndrome calculation unit 304 calculates a syndrome message based on the original signal. The syndrome message can be used to correct errors added to the original signal. The syndrome calculation unit 304 outputs the syndrome message to the syndrome sending unit 305.

The syndrome sending unit 305 inputs the syndrome message from the syndrome calculation unit 304. The syndrome sending unit 305 sends the syndrome message through a clear channel 30. The clear channel 30 can correctly carry any signal.

As shown in FIG. 4, the receiver 400 comprises a control unit 401, a signal receiving unit 402, a syndrome receiving unit 403, a decoding unit 404 and a restored original signal output unit 405.

The control unit 401 controls various elements in the receiver 400.

The signal receiving unit 402 receives a signal through the noisy channel 20. The received signal corresponds to the noisy original signal sent by the transmitter 300. The signal receiving unit 402 outputs the received signal to the decoding unit 404.

The syndrome receiving unit 403 receives the syndrome message through the clear channel 30. The syndrome receiving unit 403 outputs the syndrome message to the decoding unit 404.

The decoding unit 404 inputs the received signal from the signal receiving unit 402 and inputs the syndrome message from the syndrome receiving unit 403. The decoding unit 404 decodes the received signal by using the syndrome message. As described above, the received signal corresponds to the noisy original signal. Therefore, the decoding unit 404 can restore the original signal through the decoding process. The decoding unit 404 outputs the restored original signal to the restored original signal output unit 405.

The restored original signal output unit 405 inputs the restored original signal from the decoding unit 404. The restored original signal output unit 405 outputs the restored original signal 80. The restored original signal 80 serves as a whole of shared data in the receiver 400.

Finally, the transmitter 300 and receiver 400 can share identical data. The identical data corresponds to the original signal.

Figure 7A:
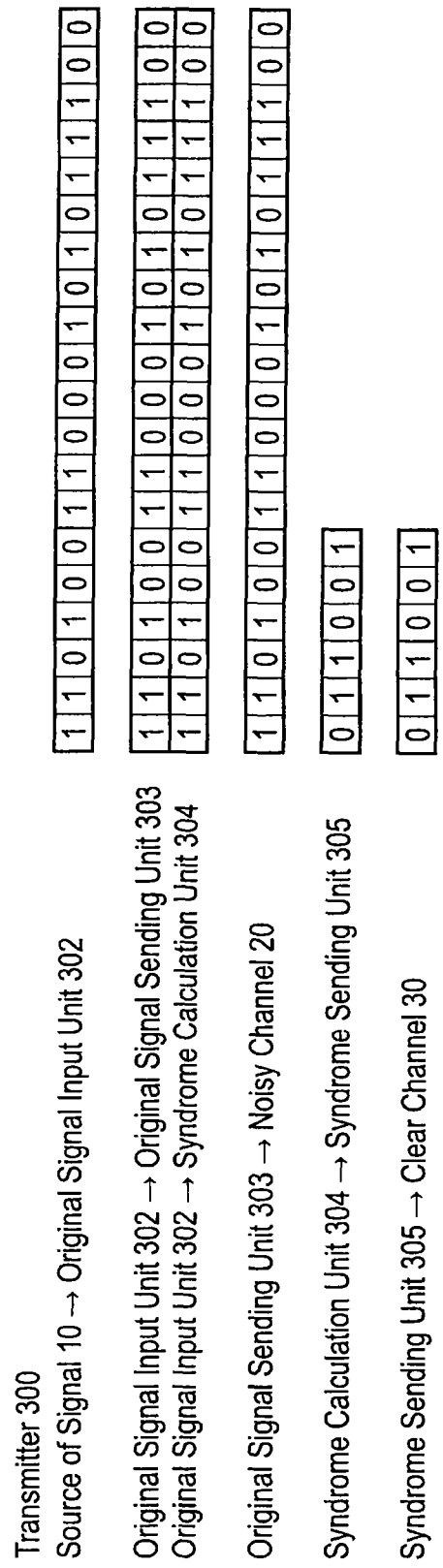
FIG. 7A shows example data at every stage of the process performed by the transmitter of FIG. 3.
Figure 7B:
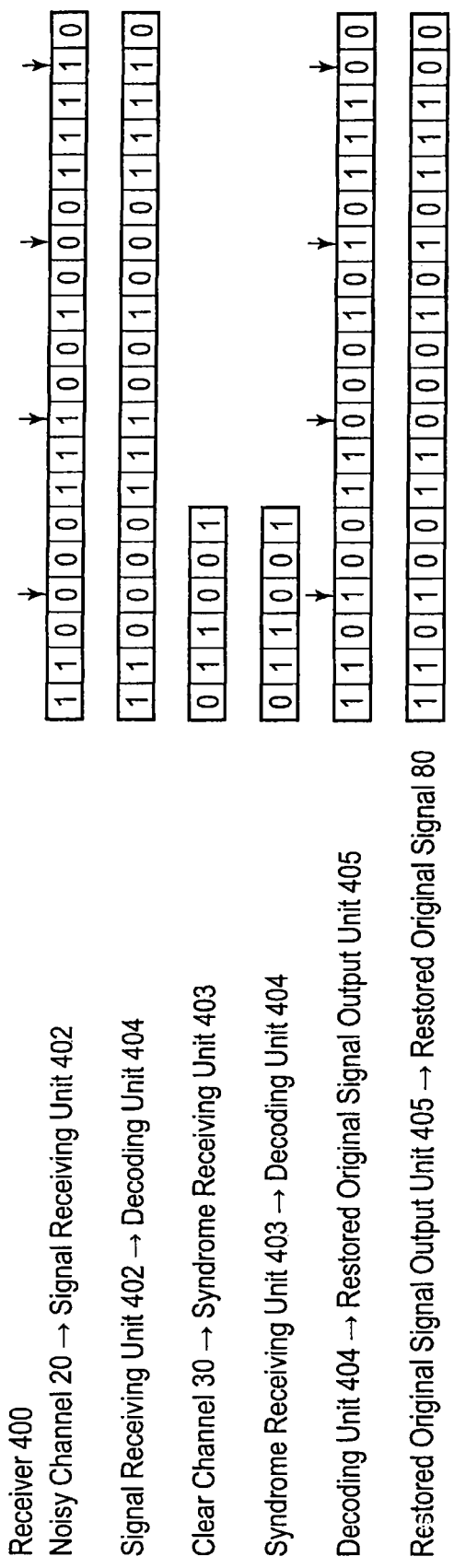
FIG. 7B shows example data at every stage of the process performed by the receiver of FIG. 4.
Figure 8A:
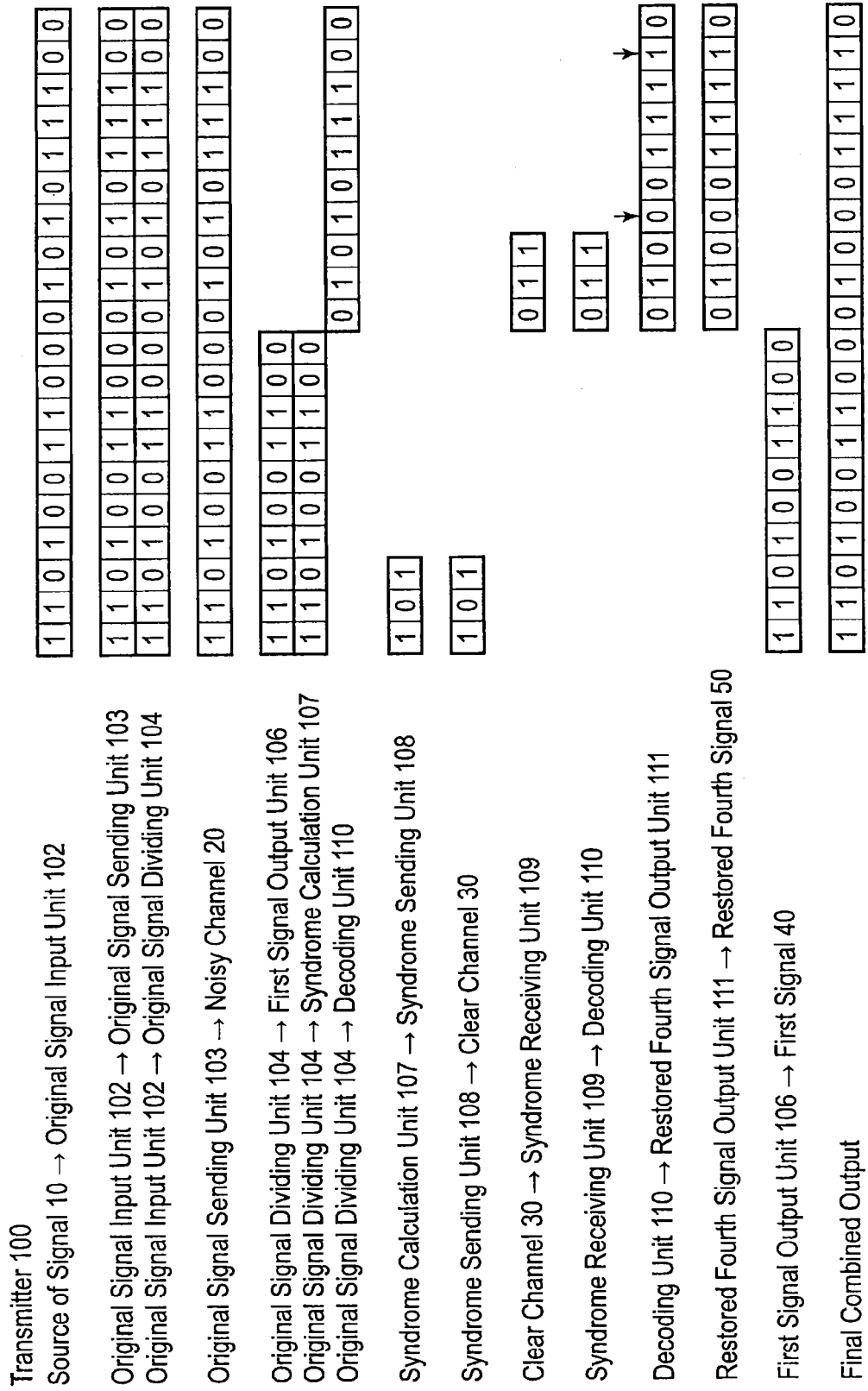
FIG. 8A shows example data at every stage of the process performed by the transmitter of FIG. 1.
Figure 8B:
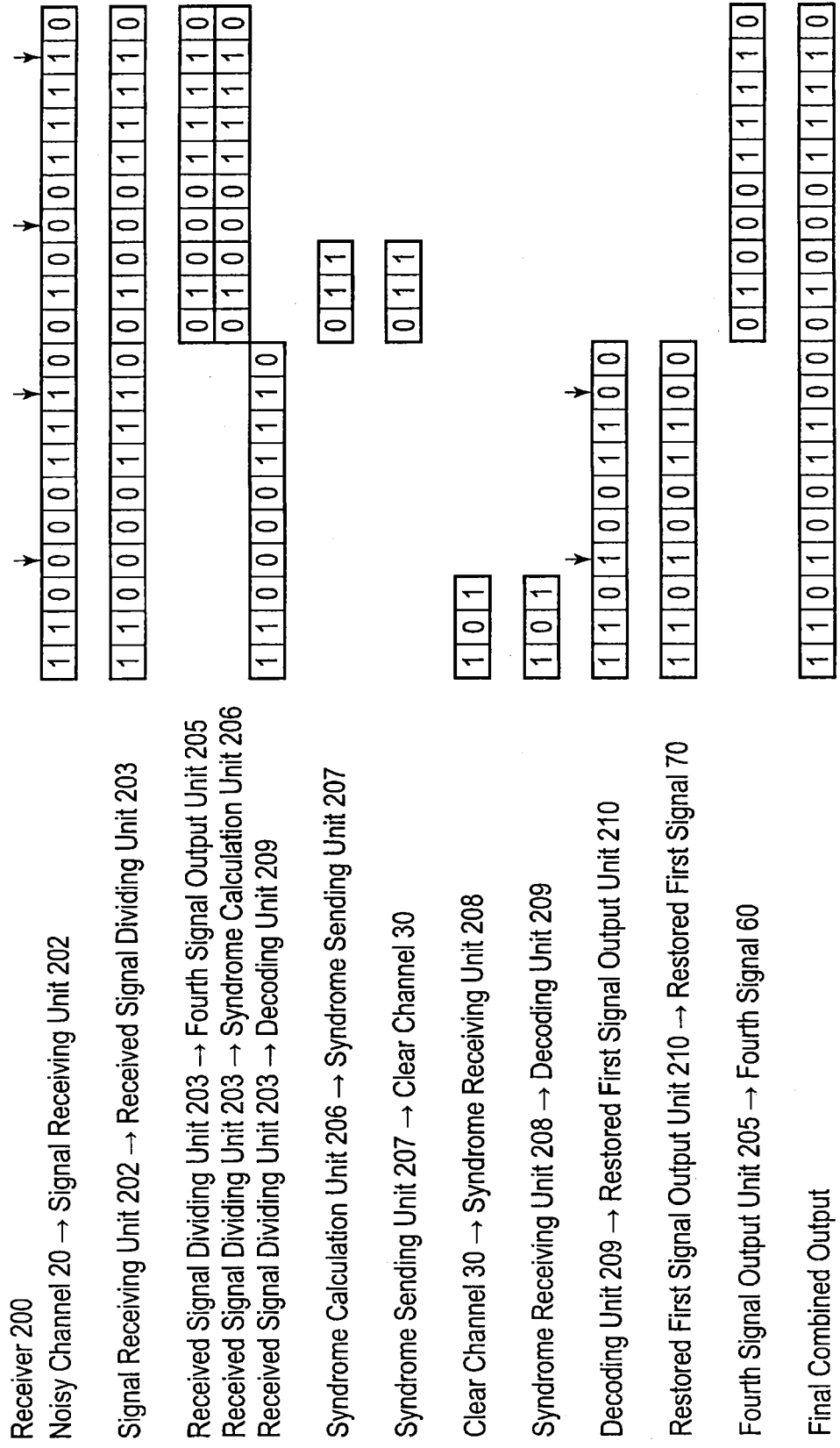
FIG. 8B shows example data at every stage of the process performed by the receiver of FIG. 2.

Example data processed in the single direction decoding and the bi-directional decoding will be described below. FIGS. 7A and 7B show example data at every stage of the process performed by the transmitter 300 and receiver 400. FIGS. 8A and 8B show example data at every stage of the process performed by the transmitter 100 and receiver 200.

As shown in FIG. 7A, the original signal is set to "11010011000101011100." The original signal is sent through the noisy channel 20. Further, the syndrome message is calculated based on the original signal. In this example, the syndrome message is "011001." The syndrome message is sent through the clear channel 30.

As shown in FIG. 7B, a signal of "11000011100100011110" is received through the noisy channel 20. The received signal corresponds to the noisy original signal. Therefore, in the received signal, the $4^{th}$ bit, $9^{th}$ bit, $14^{th}$ bit and $19^{th}$ bit of the original signal are inverted by the noise added by the noisy channel 20. Further, a syndrome message of "011001" is received through the clear channel 30. The received syndrome message is identical to the syndrome message sent by the transmitter 300.

Then, the received signal is decoded by using the syndrome message. As a result, errors in $4^{th}$ bit, $9^{th}$ bit, $14^{th}$ bit and $19^{th}$ bit of the received signal are corrected. Therefore, the restored original signal which is identical to the original signal sent by the transmitter 300 is obtained. Finally, the transmitter 300 and receiver 400 can share the data of "11010011000101011100."

As shown in FIG. 8A, the original signal is set to "11010011000101011100." The original signal is sent through the noisy channel 20. Further, the original signal is divided into two parts. To be more precise, the original signal of "11010011000101011100" is divided into the first signal of "1101001100" and the second signal of "0101011100." Then, the first syndrome message is calculated based on the first signal. In this example, the first syndrome message is "101." The first syndrome message is sent through the clear channel 30. The residual example data processed by the transmitter 100 will be described below.

As shown in FIG. 8B, a signal of "11000011100100011110" is received through the noisy channel 20. The received signal corresponds to the noisy original signal. Therefore, in the received signal, the $4^{th}$ bit, $9^{th}$ bit, $14^{th}$ bit and $19^{th}$ bit of the original signal are inverted by the noise added by the noisy channel 20.

Then, the received signal is divided into two parts. To be more precise, the received signal of "11000011100100011110" is divided into the third signal of "1100001110" and the fourth signal of "0100011110." As described above, the third signal and fourth signal correspond to the noisy first signal and noisy second signal. Therefore, in the third signal, the $4^{th}$ bit and $9^{th}$ bit of the first signal are inverted by the noise added by the noisy channel 20. In the fourth signal, $4^{th}$ bit and $9^{th}$ bit of the second signal are inverted by the noise added by the noisy channel 20.

Then the second syndrome message is calculated based on the fourth signal. In this example, the second syndrome message is "011." The second syndrome message is sent through the clear channel 30. Further, a syndrome message of "101" is received through the clear channel 30. The received syndrome message is identical to the first syndrome message sent by the transmitter 100.

Then, the third signal is decoded by using the first syndrome message. As a result, $4^{th}$ bit and $9^{th}$ bit of the third signal are corrected. Therefore, the restored first signal which is identical to the first signal sent by the transmitter 100 is obtained. Accordingly, the receiver 200 obtains the restored first signal of "1101001100" and the fourth signal of "0100011110."

On the other hand, returning to FIG. 8A, a syndrome message of "011" is received through the clear channel 30. The received syndrome message is identical to the second message sent by the receiver 200.

Then the second signal is decoded by using the second syndrome message. It should be noted that, as described above, the second signal corresponds to the noisy fourth signal. As a result, $4^{th}$ bit and $9^{th}$ bit of the second signal are corrected. Therefore, the restored fourth signal which is identical to the fourth signal received by the receiver 200 is obtained. Accordingly, the transmitter 100 obtains the first signal of "1101001100" and the restored fourth signal of "0100011110." Finally, the transmitter 100 and the receiver 200 can share the data of "11010011000100011110."

Figure 6:
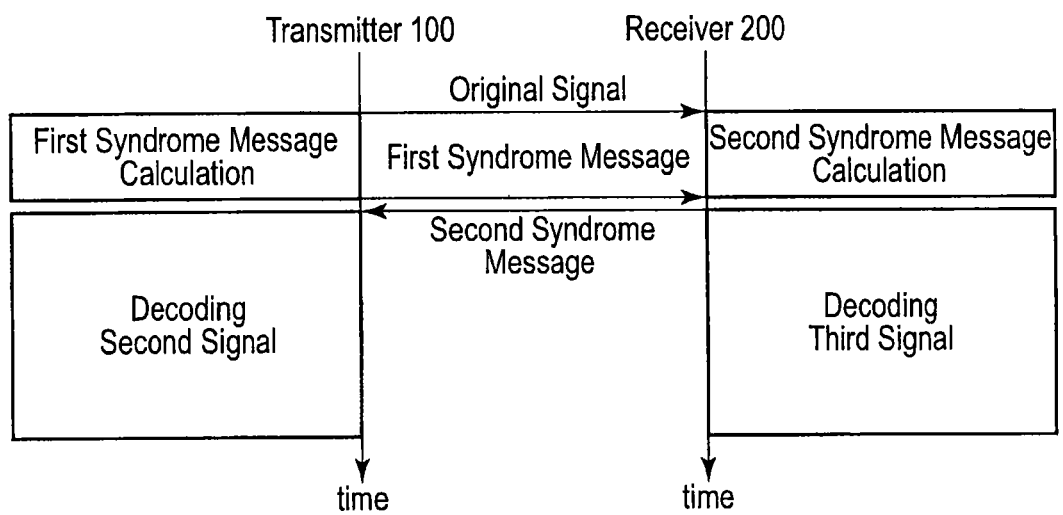
FIG. 6 is a ladder diagram illustrating the process and communications performed by the transmitter and receiver of FIGS. 1 and 2.

FIG. 5 illustrates processing and communications performed by the transmitter 300 and the receiver 400 at different points in time. On the other hand, FIG. 6 illustrates processing and communications performed by the transmitter 100 and the receiver 200 ad different points in time. According to FIGS. 5 and 6, it can be seen that the bi-directional decoding can shorten the total time required compared to the single direction decoding.

In particular, as shown in FIG. 5, the receiver 400 must perform entire decoding process (which is computationally expensive). In contrast, as shown in FIG. 6, both the transmitter 100 and the receiver 200 can simultaneously perform divided decoding process. Further, the syndrome calculation process is not computationally expensive and can be carried out in parallel with the decoding process. Therefore, according to the bi-directional decoding, the computational resources in the transmitter 100 and the receiver 200 can be efficiently used. As a result, the bi-directional decoding can increase the throughput rate of error correction compared to the single direction decoding.

FIG. 9 shows the throughput rates for both the bi-directional decoding and the single direction decoding. The throughput rates are measured for software implementations of both the bi-directional decoding and the single direction decoding. In FIG. 9, the axis of abscissas indicates signal error rate. The axis of ordinate indicates the throughput rates for both the bi-directional decoding (see triangular marks) and the single direction decoding (see square marks). As observed from FIG. 9, the bi-directional decoding approximately doubles the throughput rate for the single direction decoding at all signal error rates.

As described above, the transmitter and the receiver according to the first embodiment perform the divided syndrome calculation and the divided decoding based on the common dividing policy. In other words, the transmitter and the receiver balance their computational resources. Therefore, according to the transmitter and the receiver, it is possible to increase the throughput rate of error correction compared to the single direction decoding. In particular, assuming both the transmitter and the receiver have equivalent available computational resources, the bi-directional decoding can substantially double the throughput rate compared to the single direction decoding.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data sharing method, comprising:
sending, by a transmitter, an original signal through a noisy channel;
receiving, by a receiver, the original signal through the noisy channel to obtain a received signal;
defining, by the transmitter, a common dividing policy;
dividing, by the transmitter, the original signal into a first signal and a second signal based on the common dividing policy;
defining, by the receiver, the common dividing policy;
dividing, by the receiver, the received signal into a third signal and a fourth signal based on the common dividing policy, the third signal and the fourth signal being corresponding to the first signal and the second signal;
calculating, by the transmitter, a first syndrome message for error correction based on the first signal;
sending, by the transmitter, the first syndrome message through a clear channel;
receiving, by the receiver, the first syndrome message through the clear channel;
calculating, by the receiver, a second syndrome message for error correction based on the fourth signal;
sending, by the receiver, the second syndrome message through the clear channel;
receiving, by the transmitter, the second syndrome message through the clear channel;
decoding, by the transmitter, the second signal by using the second syndrome message to restore the fourth signal; and
decoding, by the receiver, the third signal by using the first syndrome message to restore the first signal.

2. The method according to claim 1, wherein the common dividing policy is local rules which are available for the transmitter and the receiver.

3. The method according to claim 2, wherein the common dividing policy is an even and odd policy for substantially equally dividing the original signal and substantially equally dividing the received signal.

4. The method according to claim 1, further comprising:
monitoring, by the transmitter, available computational resources in the transmitter;
monitoring, by the receiver, available computational resources in the receiver;
communicating, by the transmitter and the receiver, monitored computational resources in the transmitter and the receiver; and
controlling, by the transmitter and the receiver, the common dividing policy based on monitored computational resources in the transmitter and the receiver.

5. A transmitter, comprising:
a signal sending unit configured to send an original signal through a noisy channel;
a policy configuration unit configured to define a common dividing policy;
a signal dividing unit configured to divide the original signal into a first signal and a second signal based on the common dividing policy;
a syndrome calculation unit configured to calculate a first syndrome message for error correction based on the first signal;
a syndrome sending unit configured to send the first syndrome message through a clear channel;
a syndrome receiving unit configured to receive a second syndrome message through the clear channel; and
a decoding unit configured to decode the second signal by using the second syndrome message to restore a fourth signal, the fourth signal being corresponding to the second signal received by a receiver through the noisy channel.

6. A receiver, comprising:
a signal receiving unit configured to receive an original signal through a noisy channel to obtain a received signal, the original signal being including a first and a second signal;
a policy configuration unit configured to define a common dividing policy;
a signal dividing unit configured to divide the received signal into a third signal and a fourth signal based on the common dividing policy, the third signal and the fourth signal being corresponding to the first signal and the second signal;
a syndrome receiving unit configured to receive a first syndrome message through a clear channel;
a syndrome calculation unit configured to calculate a second syndrome message based on the fourth signal;
a syndrome sending unit configured to send the second syndrome message through the clear channel; and
a decoding unit configured to decode the third signal by using the first syndrome message to restore the first signal.

7. A data sharing system, comprising:
a transmitter; and
a receiver, wherein
the transmitter comprises:
a signal sending unit configured to send an original signal through a noisy channel;
a first policy configuration unit configured to define a common dividing policy;
a first signal dividing unit configured to divide the original signal into a first signal and a second signal based on the common dividing policy;

a first syndrome calculation unit configured to calculate a first syndrome message for error correction based on the first signal;

a first syndrome sending unit configured to send the first syndrome message through a clear channel;

a first syndrome receiving unit configured to receive a second syndrome message through the clear channel; and a first decoding unit configured to decode the second signal by using the second syndrome message to restore a fourth signal, the receiver comprises:

a signal receiving unit configured to receive the original signal through the noisy channel to obtain a received signal;

a second policy configuration unit configured to define the common dividing policy;

a second signal dividing unit configured to divide the received signal into a third signal and the fourth signal based on the common dividing policy, the third signal and the fourth signal being corresponding to the first signal and the second signal;

a second syndrome receiving unit configured to receive the first syndrome message through the clear channel;

a second syndrome calculation unit configured to calculate a second syndrome message based on the fourth signal;

a second syndrome sending unit configured to send the second syndrome message through the clear channel; and a second decoding unit configured to decode the third signal by using the first syndrome message to restore the first signal.

8. A non-transitory computer readable storage medium storing instructions of a computer program which when executed by a computer results in performance of steps comprising:

sending, by a transmitter, an original signal through a noisy channel;

receiving, by a receiver, the original signal through the noisy channel to obtain a received signal;

defining, by the transmitter, a common dividing policy;

dividing, by the transmitter, the original signal into a first signal and a second signal based on the common dividing policy;

defining, by the receiver, the common dividing policy;

dividing, by the receiver, the received signal into a third signal and a fourth signal based on the common dividing policy, the third signal and the fourth signal being corresponding to the first signal and the second signal;

calculating, by the transmitter, a first syndrome message for error correction based on the first signal;

sending, by the transmitter, the first syndrome message through a clear channel;

receiving, by the receiver, the first syndrome message through the clear channel;

calculating, by the receiver, a second syndrome message for error correction based on the fourth signal;

sending, by the receiver, the second syndrome message through the clear channel;

receiving, by the transmitter, the second syndrome message through the clear channel;

decoding, by the transmitter, the second signal by using the second syndrome message to restore the fourth signal; and decoding, by the receiver, the third signal by using the first syndrome message to restore the first signal.

* * * * *